Patented Aug. 4, 1925.

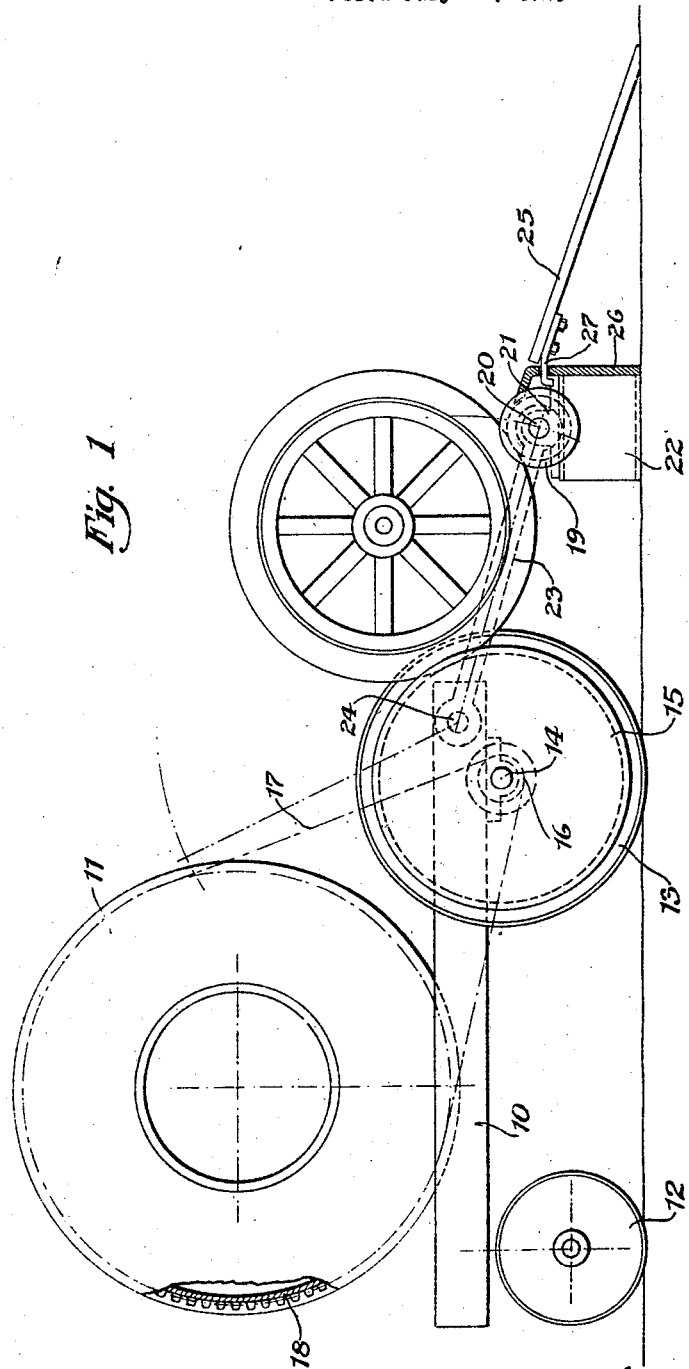

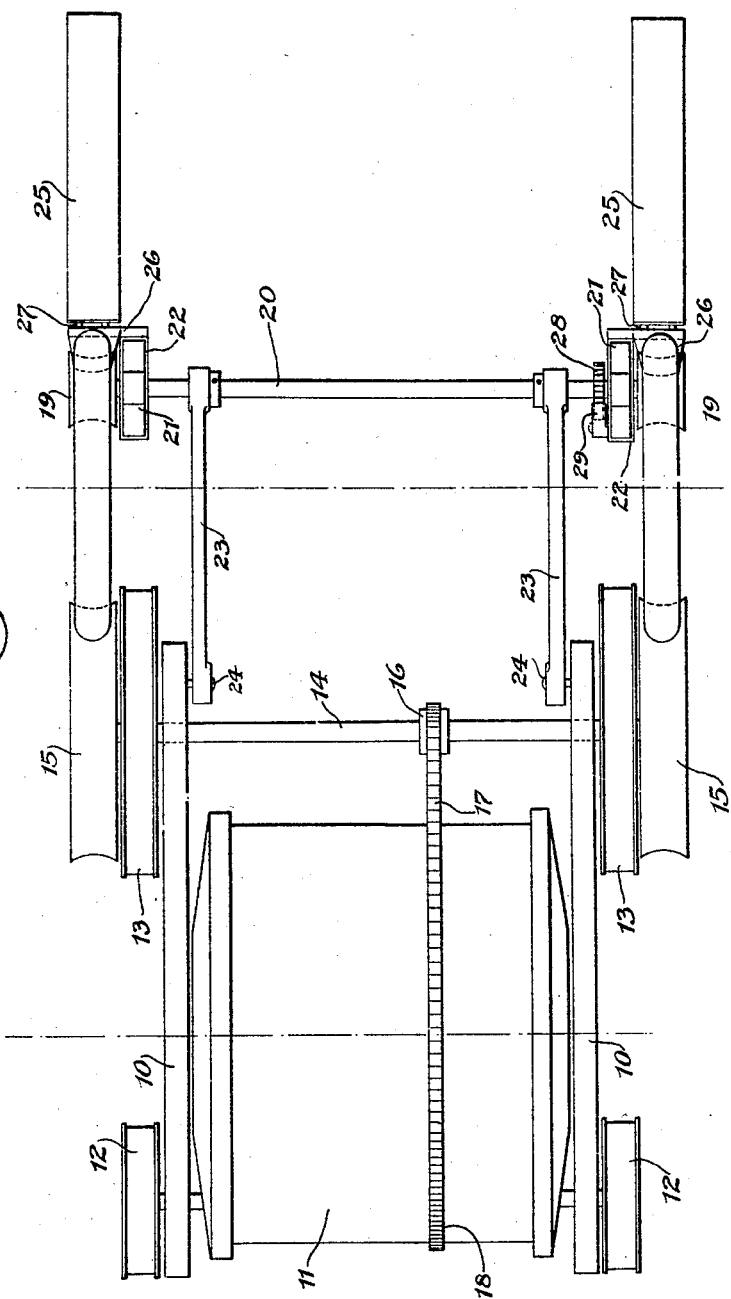

1,548,647

UNITED STATES PATENT OFFICE.

GEORGE T. ALLEN, OF NEW YORK, N. Y., AND CHARLES R. CUMMING, OF WESTFIELD, NEW JERSEY.

AUTOMOBILE ACTUATED MECHANISM.

Application filed July 15, 1921. Serial No. 484,941.

*To all whom it may concern:*

Be it known that we, GEORGE T. ALLEN and CHARLES R. CUMMING, citizens of the United States, and residents of the city, county, and State of New York and the town of Westfield, county of Union, and State of New Jersey, respectively, have invented certain new and useful Improvements in Automobile Actuated Mechanisms, of which the following is a specification.

Our invention relates in general to mechanically operating units such as concrete mixers, rotary saws, water pumps, fertilizer mixers and similar devices such as may find useful application on the farm or in small plants. A particular object in view is to adapt such operating units to being tractively coupled with the driving wheels of an automobile so that power may be readily applied to them without the necessity of having special engines for the purpose. It has already been proposed to provide a special form of truck on to which an automobile may be run, the truck being provided with a power shaft fitted with pulleys driven by the wheels of the automobile. As distinguished from this ordinary construction, the present invention is directed rather to a special construction of the machine to be driven, such as the concrete mixer, for example, by which it may receive power directly from the automobile without the inter-position of a distinct and separate unit such as the special truck above referred to.

To this end, our invention comprises a mechanically operating unit having as one of its elements a power transmitting device, which is adapted to be directly coupled in tractive relation with the driven wheels of an automobile.

The particular mechanism, which is to be operated, is not in itself a novel feature of the invention and, hence, a clear description of one example of such mechanism will suffice to make the invention clear to those skilled in the art. For this purpose, we shall describe an embodiment of the invention in the form of a concrete mixer constructed with the power coupling according to our invention. Such an apparatus is shown by way of example in the accompanying drawing, in which Figure 1 is a side elevation of the same, and Figure 2 is a top plan view thereof.

Referring in detail to said drawing, 10 indicates a pair of side frames, on which the mixing drum 11, of any approved and well known construction, is operatably mounted. This part of the apparatus is shown only in diagram, as its details form no part of our present invention. The mixer may be supported on two pairs of wheels 12 and 13 in ordinary manner, the wheels 13 being larger than the wheels 12 and mounted loosely on a shaft 14, which may pass through suitable bearings in or supported by the side frames 10. The mixer may ordinarily be transported on the two pairs of wheels 12 and 13. The shaft 14 extends outwardly beyond the wheels 13 and has fixed thereon a pair of drive pulleys 15, the outer periphery of which is contoured to adapt it to tractively engage the wheels of an automobile, as will be described. Shaft 14 may be provided with a sprocket wheel 16, which drives a chain 17 and sprocket band 18 mounted on the drum 11. It is thus apparent that, when shaft 14 is driven, the drum 11 will be rotated to effect the mixing or other purpose of the mechanism.

The device ordinarily rests upon its two pairs of wheels 12 and 13 so that the pulleys 15 are supported free from the ground, and as the wheels 13 are free on shaft 14, the driving of the pulleys 15 is not interfered with by the engagement of wheels 13 on the ground. To enable the rear wheels of the automobile to be readily applied in tractive engagement with the pulleys 15, we provide an additional pair of wheels or pulleys 19, both of which are fixibly secured on a shaft 20 mounted in bearings 21, which are provided on supporting blocks 22. Shaft 20 with its connected parts is pivotally attached, for example, to the side frames 10 of the concrete mixer by means of arms 23, which swing on an arc about their pivots 24 so that the auxiliary pulleys 19 may be brought down into operating position and held at a suitable distance from the pulleys 15 or may be thrown upward into a normal, inoperative position leaning against the mixing drum 11, as indicated diagrammatically in Figure 1. When the coupling constituted by shaft 20 with its connected parts and the pivotal arm 23 is in its operating position, as shown in full lines in Figures 1 and 2, the blocks 22 may rest firmly upon the ground and, in this position, the car may be backed on to the coupling wheels by running up the tracks or ways 25, which are detachably mounted in a perforated, metal plate 26 by means of fingers or hooks 27. The plate 26 is bent inwardly at its top to form a continuation of the surface of tracks 25 and is preferably curved to conform with the contour of pulleys 19 without actually contacting therewith.

The shaft 20 is provided with a fixed ratchet wheel 28, which may be engaged by a manually actuated pawl 29 to lock the shaft 20 against rotation when it is desired to run the automobile off the pulleys 19.

The operation of the device will be clear from the above description. When it is desired to drive the drum 11, the coupling frame is swung from its normal retracted position down into its extended position with the blocks 22 resting upon the ground. The runways 25 may then be attached and the automobile backed into position with its rear wheels supported between pulleys 19 and 15. The pawl 29, during this operation, is out of engagement with the ratchet 28 so that the shaft 20 is free to turn with the pulleys 19. The automobile engine may then be driven to apply power tractively to the surfaces of pulleys 15, which thereby rotate the shaft 14 and, through the sprocket mechanism, drive the drum 11. When it is desired to withdraw the car from the device, the pawl 29 is manually thrown into locking engagement with the ratchet wheel 28, thus fixing shaft 20 and pulleys 19 against turning, whereupon the automobile may be driven down from the operating position described. The runways 25 may then be removed and the coupling frame swung upward into normal position resting against the drum 11.

We claim:—

1. Apparatus of the character described comprising in combination a main frame and wheels on which it may be transported, a shaft mounted on said frame, a pair of traction pulleys fixedly secured on said shaft, an auxiliary shaft with supporting pulleys mounted thereon, a swinging frame carrying said auxiliary shaft and pivoted to the main frame, supporting journal blocks carried by the auxiliary shaft and adapted to support the same on the ground when in operative position, the swinging frame, auxiliary shaft and supporting blocks being supported entirely by the main frame clear of the ground when folded up for purposes of transportation.

2. Apparatus of the character described comprising in combination a mechanically operating device having a main frame and wheels on which it may be transported, a shaft constituting an axle on which one pair of said transporting wheels are freely mounted, transmitting mechanism connecting said shaft with the device to be driven, a pair of traction pulleys fixedly secured on said shaft, and means for rotatably supporting the driven wheels of an automobile in tractive engageemnt with said pair of traction pulleys.

3. Mechanically operating apparatus comprising in combination a pair of traction pulleys operatively connected with the mechanism to be driven, a pair of auxiliary pulleys adapted to rotatably support the driven wheels of an automobile in tractive engagement with said traction pulleys, supporting means for said auxiliary pulleys, said supporting means having a perforated plate bent inward over the auxiliary pulleys to support the wheels of the automobile in passing on to and off of said auxiliary pulleys and a pair of runways having hooks adapted to engage in the perforations of said plate for securing the same thereto.

GEORGE T. ALLEN.
CHARLES R. CUMMING.